(12) United States Patent
Yumoto et al.

(10) Patent No.: US 7,163,997 B2
(45) Date of Patent: Jan. 16, 2007

(54) POLYETHER DERIVATIVE AND PROCESS FOR PRODUCING THE SAME

(75) Inventors: Masatoshi Yumoto, Shizuoka-ken (JP); Takashi Tamura, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 371 days.

(21) Appl. No.: 10/687,610

(22) Filed: Oct. 20, 2003

(65) Prior Publication Data

US 2004/0087760 A1    May 6, 2004

(30) Foreign Application Priority Data

Oct. 21, 2002    (JP)    ............................. 2002-305580

(51) Int. Cl.
  G08G 64/00    (2006.01)
  G08G 65/00    (2006.01)
  G08G 73/00    (2006.01)
  G08G 75/00    (2006.01)

(52) U.S. Cl. ....................... 528/371; 528/370; 528/372; 528/373; 528/391; 528/422; 528/425

(58) Field of Classification Search ..................... None
See application file for complete search history.

(56) References Cited

U.S. PATENT DOCUMENTS 4,328,322 A * 5/1982 Baron ......................... 521/163
4,829,099 A * 5/1989 Fuller et al. ................. 606/214

FOREIGN PATENT DOCUMENTS

| JP | 62-212190 A | 9/1987 |
| JP | 4-261893 A | 9/1992 |
| JP | 10-114153 A | 5/1998 |
| JP | 11-263834 A | 9/1999 |

OTHER PUBLICATIONS

Hirotsugu Sato et al., Journal of Image Electronic Society:, vol. 11, No. 4, 1982, pp. 290-296.
Toshimasa Usami, et al., "UV-Fixable Diazo Type Thermal Recording Material", Denshi Shashin Gakkai Shi 26, No. 2 (1987): 115-119.
Shouhei Yoshida, et al., "Mechanism of Color Development for UV-Fixable Thermal Recording Material," Denshi Shasin Gakai Shi 26, No. 2. (1987): 120-125.
Asaji Kondo, Microcapsule:, The Nikkan Kogyo Shimbun, Ltd., 1970.
Tamotsu Kondo, "Microcapsule", Sankyo Shuppan, 1977.
J. Org. Chem., vol. 45, No. 26, 1980, pp. 5364-5367.
Eur. Polym. J. vol. 19, No. 4, 1983, pp. 341-343.
J. Am. Chem. Soc., vol. 118, No. 42, 1996, 10150-10151.

* cited by examiner

*Primary Examiner*—Michael J. Feely
(74) *Attorney, Agent, or Firm*—Sughrue Mion, PLLC

(57) ABSTRACT

The present invention relates to a polyether derivative represented by the following general formula (I):

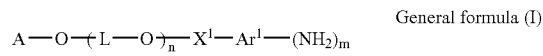

General formula (I)

wherein $X^1$ represents —CO— or —$SO_2$—; $Ar^1$ represents unsubstituted arylene, or arylene substituted with a halogen atom, or an alkyl, alkenyl, alkynyl, alkoxy, alkoxycarbonyl aryloxycarbonyl or cyano group; L represents alkylene; m is 1 or 2; A represents —$X^2$—$Ar^2$—$(NH_2)_l$, a hydrogen atom, or an alkyl, aryl or acyl group, wherein $X^2$, $Ar^2$ and l have the same meanings as the above-mentioned $X^1$, $Ar^1$ and m, respectively; and n is the average addition mole number of the polyether group, and is a numerical value of 10 to 500.

19 Claims, No Drawings

POLYETHER DERIVATIVE AND PROCESS FOR PRODUCING THE SAME

CROSS-REFERENCE TO RELATED APPLICATION

This application claims priority under 35 USC 119 from Japanese patent Application No. 2002-305580, the disclosure of which is incorporated by reference herein.

BACKGROUND OF THE INVENTION

1. Field of the Invention

The present invention relates to a new polyether derivative and a process for producing the same. More specifically, the invention relates to a polyether derivative which is useful for chemical modification of microcapsules or physiologically active protein, chemical modification in a drug delivery system, and for other purposes, and a profitable process for producing the derivative.

2. Description of the Related Art

About the so-called diazo type heat-sensitive recording materials (see, for example, Kohji Satoh et al., "Journal of the Institute of Image Electronics Engineers of Japan", vol. 11, No. 4, pp. 290–296 (1982)), a method of microencapsulating a diazonium salt compound, thereby isolating the compound from a coupler, water and a basic compound is suggested (see Tomomasa Usami et al., "Journal of the Society of Electrophotography of Japan" vol. 26, No. 2, pp.115–125 (1987)). As such microcapsules, microcapsules having a polyurethane or polyurea wall are well known (see, for example, Asaji Kondoh, "Microcapsules", published by the Nikkan Kogyo Shimbun, Ltd. in 1970, and Tamotsu Kondoh et al., "Microcapsules", published by Sankyo Shuppan Co., Ltd. in 1977).

As a polyhydric isocyanate compound which is a material for constituting the above-mentioned microcapsules having a polyurethane or polyurea wall, for example, an adduct of 2,4-tolylene diisocyanate and trimethylolpropane or an adduct of xylylene diisocyanate and trimethylolpropane is mainly used (see, for example, Japanese Patent Application Laid-Open (JP-A) Nos. 62-212190 and 4-261893). Also known is an adduct of a polymer having, at one terminal thereof, an active hydrogen (such as polyether, polyester, polyamide, polyurea, polyurethane, polysiloxane or a polymer from a vinyl monomer), and a polyfunctional isocyanate having two or more isocyanate groups therein (see, for example, JP-A No. 10-114153). The usefulness of polyether derivatives each having, at one terminal thereof, active hydrogen is described therein.

In recent years, attention has been paid to polyether compounds each having a modified terminal as important carriers for drug delivery systems or combinatorial synthesis, and compounds wherein an amino group is introduced into a polyether compound have been actively researched. As polyether derivatives having an alkyl-modified amino terminal, the following are known: a derivative obtained by tosylating a terminal hydroxyl group of polyethylene glycol, converting the tosylated group to phthalimide by Gabriel's method and further converting the phthalimide to an aminoethyl group by deprotection (see, for example, J. Org. Chem. <45> 5364 (1980)); a derivative obtained by causing a Michael reaction between acrylonitrile and the terminal hydroxyl group of methoxypolyethylene glycol, and then converting the resultant terminal group to an aminopropyl group by reduction (see, for example, JP-A No. 11-263834); a derivative obtained by causing the terminal hydroxyl group of methoxypolyethylene glycol to react with one isocyanate group of alkane diisocyanate, causing the remaining isocyanate group to react with t-butylalcohol to be converted to urethane, and further generating an aminoalkyl group by deprotection (see, for example, Eur. Poly. J. <19>, 341 (1983)); and a derivative obtained by causing the terminal hydroxyl group of methoxypolyethylene glycol to react with Boc-glycine in the presence of DCC (dicyclohexylcarbodiimide) and subsequently converting the resultant to a glycine ester by the deprotection of the Boc group with TFA (trifluoroacetic acid) (see, for example, J. Am. Chem. Soc. <118>, 10150 (1996)); and other derivatives.

However, the synthesis of these polyether derivatives each having a terminal amino group causes a number of problems: the purification thereof for example becomes difficult because of byproducts such as tosylate salt, phthalhydrazide, and dicyclohexylurea; it is also not possible to avoid using an excessive amount of acetonitrile; and in addition a side reaction is caused at the time of deprotection.

As a polyether having an aryl-modified amino terminal, a 3-amino-4-alkylaminobenzoic acid ester of methoxypolyethylene glycol is synthesized (see, for example, Tetrahedron Letters, <43>, 1529 (2002)). However, no other substitution styles have been known. Moreover, it is difficult to remove dicyclohexylurea, which is produced by a side reaction, since DCC is used to synthesize a nitrobenzoic acid ester derivative of methoxypolyethylene glycol, the ester being a precursor.

SUMMARY OF THE INVENTION

An object of the present invention is to solve the above-mentioned problems and provide a new polyether derivative having an aminoaryl terminal, and a profitable process for producing the polyether derivative.

The invention for solving the above-mentioned problems is as follows:

A first aspect of the invention is to provide a polyether derivative (K) represented by the following general formula (I):

General formula (I)

$$A-O-(L-O)_n-X^1-Ar^1-(NH_2)_m$$

wherein, in the general formula (I), $X^1$ represents —CO— or —SO$_2$—; $Ar^1$ represents unsubstituted arylene, or arylene substituted with a halogen atom, or an alkyl, alkenyl, alkynyl, alkoxy, alkoxycarbonyl, aryloxycarbonyl or cyano group; L represents alkylene; m is 1 or 2; A represents —$X^2$—$Ar^2$—(NH$_2$)$_1$, a hydrogen atom, or an alkyl, aryl or acyl group, wherein $X^2$, $Ar^2$ and 1 have the same meanings as the above-mentioned $X^1$, $Ar^1$ and m, respectively; and n is an average addition mole number of a polyether group, and is a numerical value of 10 to 500.

A second aspect of the invention is to provide a polyether derivative (K), wherein substituent A in the general formula (I) is an alkyl, aryl or acyl group.

A third aspect of the invention is to provide a polyether derivative (K), wherein the $Ar^1$ in the general formula (I) has 6 to 30 carbon atoms in all.

A fourth aspect of the invention is to provide a polyether derivative (K), wherein —$X^1$—$Ar^1$—(NH$_2$)$_m$ in the general formula (I) is a 4-aminobenzoyl, 3,5-diaminobenzoyl or 4-aminobenzensulfonyl group.

A fifth aspect of the invention is to provide a polyether derivative (K), wherein L in the general formula (I) is alkylene having 2 to 20 carbon atoms in all.

A sixth aspect of the invention is to provide a polyether derivative (K), wherein L in the general formula (I) is selected from the group consisting of ethylene, propylene, tetramethylene, phenylethylene, cyclohexylene, vinylethylene and phenoxymethylethylene.

A seventh aspect of the invention is to provide a polyether derivative (K), wherein repeating unit -(L-O)$_n$— in the general formula (I) is selected from the group consisting of polyethylene oxide, polypropylene oxide, polytetramethylene oxide, polystyrene oxide, polycyclohexylene oxide, polyethylene oxide-polypropylene oxide block copolymer, and polyethylene oxide-polypropylene oxide random copolymer.

A eighth aspect of the invention is to provide a polyether derivative (K), wherein A in the general formula (I) is an alkyl group having 1 to 30 carbon atoms in all.

A ninth aspect of the invention is to provide a polyether derivative (K), wherein A in the general formula (I) is an aryl group having 6 to 30 carbon atoms in all.

A tenth aspect of the invention is to provide a polyether derivative (K), wherein A in the general formula (I) is an acyl group having 2 to 30 carbon atoms in all.

An eleventh aspect of the invention is to provide a process (J) for producing a polyether derivative, comprising:
causing a polyether derivative represented by the following general formula (II) to react with an aromatic nitro compound represented by the following general formula (III); and
carrying out hydrogen reduction in the presence of a catalyst for catalytic hydrogen reduction to thereby yield a polyether derivative represented by the above general formula (I),

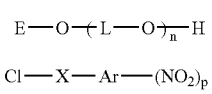

General formula (II)

Cl—X—Ar—(NO$_2$)$_p$

General formula (III)

wherein, in the general formulae (II) and (III), E represents a hydrogen atom, or an alkyl, aryl or acyl group; X represents X$^1$ or X$^2$; Ar represents Ar$^1$ or Ar$^2$; p represents m or 1; L represents alkylene; and n is an average addition mole number of a polyether group, and is a numerical value of 10 to 500.

A twelfth aspect of the invention is to provide a process (J) for producing the polyether derivative, wherein an amount of the aromatic nitro compound represented by the general formula (III) used is from 1.0 to 3.0 moles per mole of hydroxyl groups of the polyether derivative represented by the general formula (II).

A thirteenth aspect of the invention is to provide a process (J) for producing the polyether derivative, wherein for the reaction between the polyether derivative represented by the general formula (II) and the aromatic nitro compound represented by the general formula (III), a base selected from the group consisting of triethylamine, pyridine, DBU and sodium hydroxide is used.

A fourteenth aspect of the invention is to provide a process (J) for producing the polyether derivative, wherein for the reaction between the polyether derivative represented by the general formula (II) and the aromatic nitro compound represented by the general formula (III), a base selected from the group consisting of triethylamine, pyridine, DBU and sodium hydroxide is used, and an amount of the base used is from 1.0 to 3.0 moles per mole of hydroxyl groups of the polyether derivative represented by the general formula (II).

A fifteenth aspect of the invention is to provide a process for producing the polyether derivative (J), wherein for the reaction between the polyether derivative represented by the general formula (II) and the aromatic nitro compound represented by the general formula (III), a solvent selected from the group consisting of toluene, acetonitrile, tetrahydrofuran and methylene chloride is used.

A sixteenth aspect of the invention is to provide a process (J) for producing the polyether derivative, wherein for the reaction between the polyether derivative represented by the general formula (II) and the aromatic nitro compound represented by the general formula (III), a solvent selected from the group consisting of toluene, acetonitrile, tetrahydrofuran and methylene chloride is used, and an amount of the solvent used is from 0.5 to 50 ml per gram of the polyether derivative represented by the general formula (II).

A seventeenth aspect of the invention is to provide a process (J) for producing the polyether derivative, wherein the reaction between the polyether derivative represented by the general formula (II) and the aromatic nitro compound represented by the general formula (III) is conducted at a temperature of 0 to 100° C., or at a reflux temperature of a solvent used.

A eighteenth aspect of the invention is to provide a process (J) for producing the polyether derivative, wherein the polyether derivative represented by the general formula (II) is dehydrated before the reaction, and then used.

A nineteenth aspect of the invention is to provide a process (J) for producing the polyether derivative, wherein a solvent selected from the group consisting of methanol, ethanol, 2-propanol, tetrahydrofuran, and chloroform is used for the hydrogen reduction.

A twentieth aspect of the invention is to provide a process (J) for producing the polyether derivative, wherein the hydrogen reduction is conducted at a temperature of 0 to 60° C. or at a reflux temperature of a solvent used.

DETAILED DESCRIPTION OF THE INVENTION

[Polyether Derivative Represented by the General Formula (I)]

First, the polyether derivative of the invention, which is represented by the general formula (I), will be described in detail.

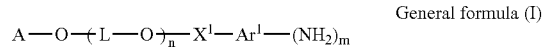

General formula (I)

In the general formula (I), X$^1$ represents —CO— or —SO$_2$—, and preferably represents —CO—.

Ar$^1$ represents unsubstituted arylene, or arylene substituted with a halogen atom, or an alkyl, alkenyl, alkynyl, alkoxy, alkoxycarbonyl, aryloxycarbonyl or cyano group. Ar$^1$ preferably has 6 to 30 carbon atoms in total, and more preferably has 6 to 20 carbon atoms in total. In the case that Ar$^1$ is substituted with the above-mentioned substituent, preferred examples of the substituent are a halogen atom, and alkyl, alkoxy, alkoxycarbonyl, aryloxycarbonyl and cyano groups. Particularly preferred examples of the substituent are a halogen atom, and alkyl and alkoxy groups. The symbol m represents 1 or 2.

Specific examples of $-X^1-Ar^1-(NH_2)_m$ include 4-aminobenzoyl, 3,5-diaminobenzoyl 4-aminobenzenesulfonyl groups and the like.

In the general formula (I), L represents an alkylene group. The alkylene group may have a substituent, and may be branched. The alkylene group preferably has 2 to 20 carbon atoms in total, and more preferably has 2 to 10 carbon atoms in total. The substituent is preferably an aryl, alkenyl, alkoxy or acyl group, and is more preferably an aryl group. Specific examples of the alkylene group include ethylene, propylene, tetramethylene, phenylethylene, cyclohexylene, vinylethylene, phenoxymethylethylene and the like.

Respective units in the repeating units $-(L-O)_n-$ in the general formula (I) may independently represent different groups. However, such units preferably represent the same group. Specific examples of the polyether having such a repeating units include polyethylene oxide, polypropylene oxide, polytetramethylene oxide, polystyrene oxide, polycyclohexylene oxide, polyethylene oxidepolypropylene oxide block copolymer, and polyethylene oxidepolypropylene oxide random copolymer.

In the general formula (I), A represents a hydrogen atom, an alkyl group, aryl group, acyl group, or $-X^2-Ar^2-(NH_2)_l$ wherein $X^2$, $Ar^2$ and l have the same difinitions as the above-mentioned $X^1$, $Ar^1$ and m, respectively. Preferably, the group $-X^2-Ar^2-(NH_2)_l$ represents the same group as the group represented by $-X^1-Ar^1-(NH_2)_m$.

The alkyl group represented by A may have a substituent, and may be branched. The alkyl group preferably has 1 to 30 carbon atoms in total, and more preferably has 1 to 20 carbon atoms in total. The substituent is preferably an aryl, alkenyl, or alkoxy group. Specific examples of the alkyl group include methyl, ethyl, butyl, isopropyl, behenyl, benzyl, allyl, oleyl, methoxyethyl groups and the like.

The aryl group represented by A may have a substituent. The aryl group preferably has 6 to 30 carbon atoms in total, and more preferably has 6 to 20 carbon atoms in total. The substituent is preferably a halogen atom, or an alkyl, alkenyl, alkynyl or alkoxy group, and is more preferably an alkyl or alkoxy group. Specific examples of the aryl group include phenyl, nonylphenyl, octylphenyl, fluorophenyl, styrylphenyl, phenylethenylphenyl, methoxyphenyl groups and the like.

The acyl group represented by A may be an aliphatic or aromatic acyl group, may have a substituent, and may be branched. The acyl group preferably has 2 to 30 carbon atoms in total, and more preferably has 2 to 20 carbon atoms in total. Examples of the substituent include neither an amino group nor a nitro group. The substituent is preferably an alkyl, aryl, alkenyl, or alkoxy group. Specific examples of the acyl group include acetyl, benzoyl, (meth)acryloyl, oleoyl, lauroyl, stearoyl, methoxybenzoyl groups and the like.

Among these groups represented by A, the group of $-X^2-Ar^2-(NH_2)_l$, the alkyl group, the aryl group and the acyl group are preferable, and the alkyl group, the aryl group and the acyl group are more preferable. The alkyl group is most preferable.

The symbol n represents the average addition mole number of a polyether group, and represents a number of 10 to 500, preferably 10 to 400, and more preferably 10 to 300.

The following will illustrate specific examples of the polyether derivative of the invention, which is represented by the general formula (I). However, the invention is not limited to these examples.

| | | $A-O-(CH_2CH_2O)_n-X^1-Ar^1-(NH_2)_m$ | |
|---|---|---|---|
| No | A | $-X^1-Ar^1-(NH_2)_m$ | n |
| 1-1 | $CH_3$ | $-CO-C_6H_4-NH_2$ (para) | 98 |
| 1-2 | $CH_3$ | $-CO-C_6H_4-NH_2$ (para) | 113 |
| 1-3 | $CH_3$ | $-CO-C_6H_4-NH_2$ (para) | 45 |
| 1-4 | $CH_3$ | $-CO-C_6H_4-NH_2$ (ortho, $H_2N$ at top) | 45 |
| 1-5 | $CH_3$ | $-CO-C_6H_3(CH_2Cl)-NH_2$ | 17 |

-continued

| | | A—O—(CH₂CH₂O)ₙ—X¹—Ar¹—(NH₂)ₘ | |
|---|---|---|---|
| No | A | —X¹—Ar¹—(NH₂)ₘ | n |
| 1-6 | CH₃ | 3-chloro-2-amino benzoyl (—CO— with Cl and NH₂ substituents) | 98 |
| 1-7 | H | 3-methoxy-4-amino benzoyl (—CO—, OCH₃ and NH₂) | 113 |
| 1-8 | C₂H₅ | 2-fluoro-5-amino benzoyl (—CO—, F and NH₂) | 220 |
| 1-9 | C₁₈H₃₇ | 2-methyl-5-amino benzoyl (—CO—, H₃C and NH₂) | 110 |
| 1-10 | C₁₂H₂₅ | 4'-amino-4-biphenylcarbonyl (—CO—C₆H₄—C₆H₄—NH₂) | 98 |
| 1-11 | C₉H₁₉—C₆H₄—CH₂— | —CO— with H₃COOC and NH₂ substituents | 90 |
| 1-12 | C₈H₁₇—C₆H₄—CH₂— | —CO— with allyl and NH₂ substituents | 98 |
| 1-13 | CH₂=C(CH₃)—CO— | —CO— with phenylethynyl and NH₂ substituents | 98 |
| 1-14 | C₈H₁₇CH=CHC₇H₁₅CO— | —CO— with PhOOC and NH₂ substituents | 98 |
| 1-15 | CH₃ | —CO— with NC and NH₂ substituents | 98 |

-continued

| | | A—O—(CH$_2$CH$_2$O)$_n$—X$^1$—Ar$^1$—(NH$_2$)$_m$ | |
|---|---|---|---|
| No | A | —X$^1$—Ar$^1$—(NH$_2$)$_m$ | n |
| 1-16 | CH$_3$ | —CO—C$_6$H$_3$(NH$_2$)$_2$ (3,5-diamino) | 98 |
| 1-17 | CH$_3$ | —CO—C$_6$H$_3$(NH$_2$)$_2$ (2,4-diamino) | 45 |
| 1-18 | CH$_3$ | —CO—C$_6$H$_2$(CH$_3$)(NH$_2$)$_2$ | 17 |
| 1-19 | C$_{12}$H$_{25}$ | —CO—C$_6$H$_2$(Cl)(NH$_2$)$_2$ | 113 |
| 1-20 | CH$_3$ | —CO—(6-amino-2-naphthyl) | 90 |
| 1-21 | CH$_3$ | —CO—C$_6$H$_4$—NH$_2$ (meta) | 45 |
| 1-22 | CH$_3$ | —SO$_2$—C$_6$H$_4$—NH$_2$ (para) | 98 |
| 1-23 | CH$_3$ | —SO$_2$—C$_6$H$_3$(OC$_6$H$_{13}$)—NH$_2$ | 113 |
| 1-24 | CH$_3$ | —SO$_2$—C$_6$H$_3$(CH$_3$)—NH$_2$ | 75 |

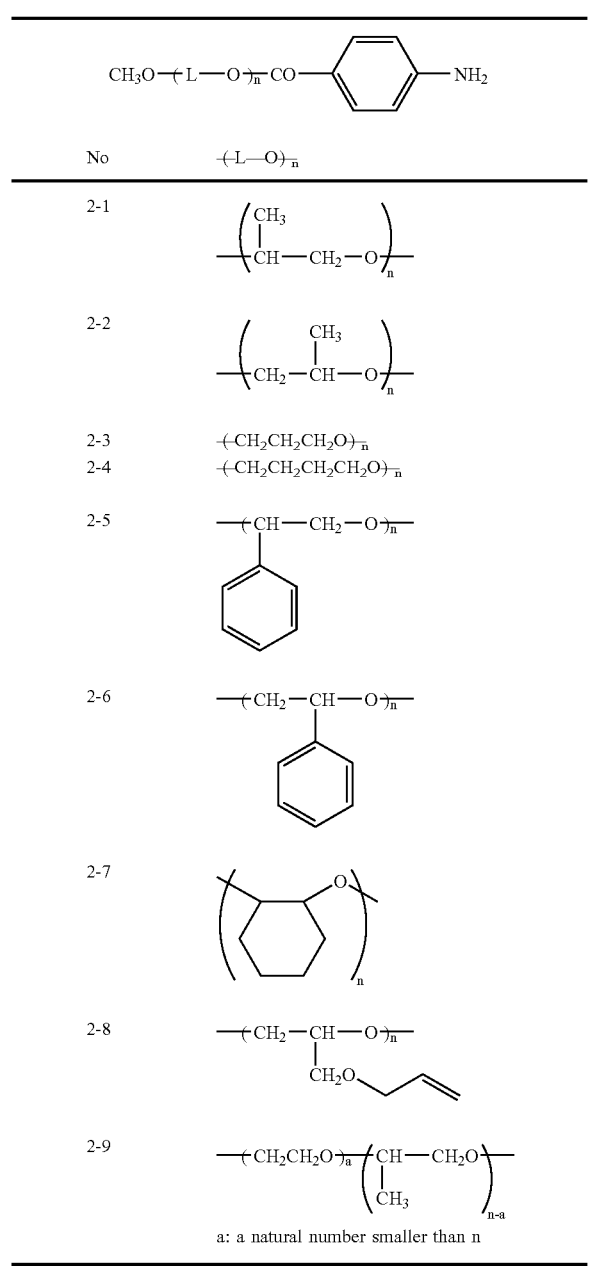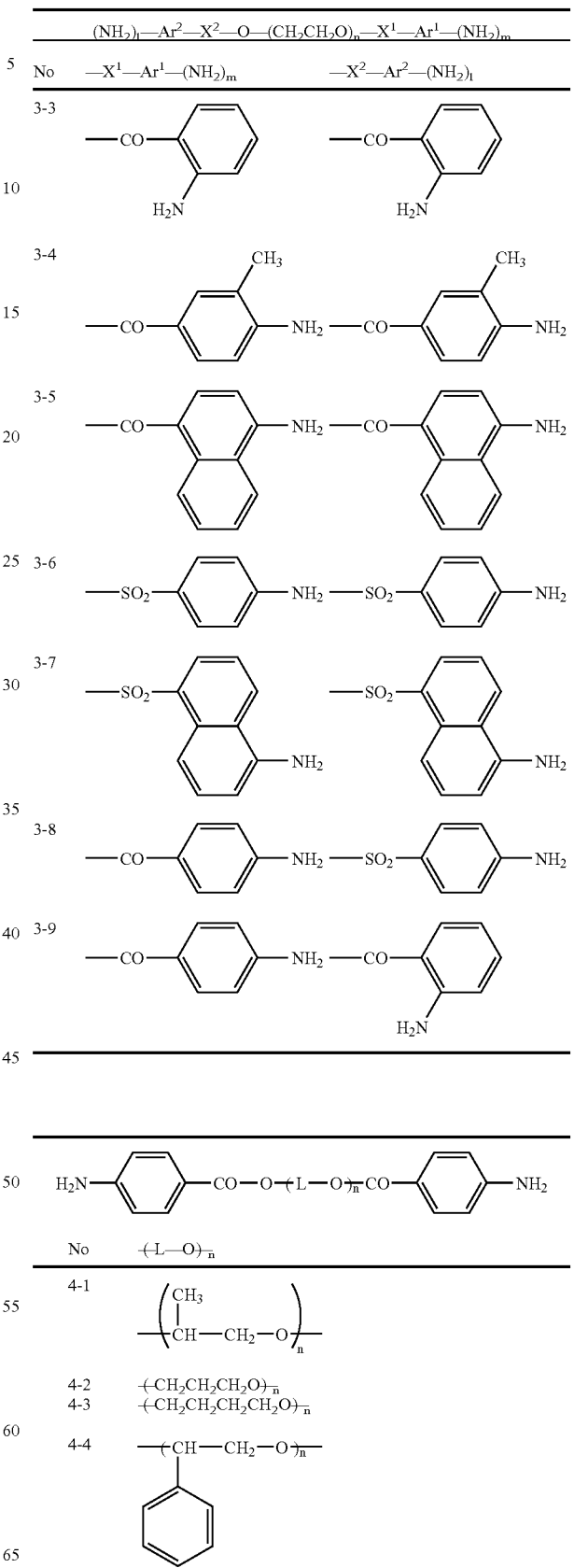

-continued

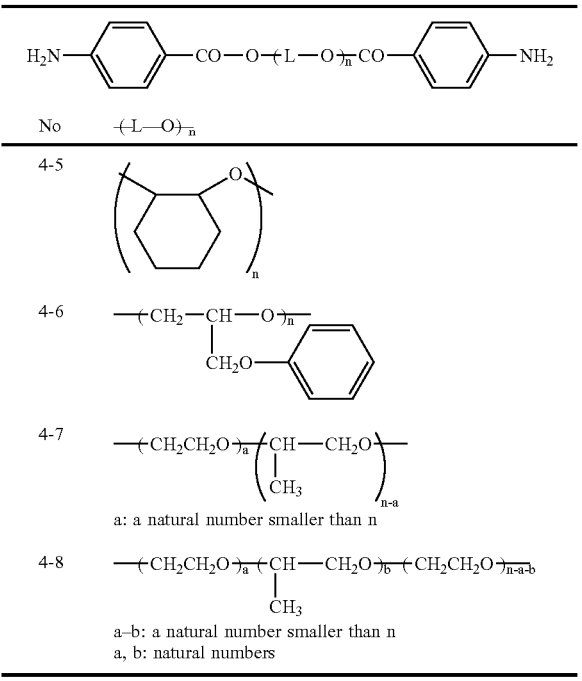

| No | $+L-O+_n$ |
|---|---|
| 4-5 | (cyclohexane oxide repeating unit) |
| 4-6 | $-(CH_2-CH-O)_n-$ with $CH_2O$—phenyl side chain |
| 4-7 | $-(CH_2CH_2O)_a-(CH-CH_2O)_{n-a}-$ with $CH_3$ side chain; a: a natural number smaller than n |
| 4-8 | $-(CH_2CH_2O)_a-(CH-CH_2O)_b-(CH_2CH_2O)_{n-a-b}-$ with $CH_3$ side chain; a–b: a natural number smaller than n; a, b: natural numbers |

(Process for Producing the Polyether Derivative)

The following will describe in detail a process for producing the polyether derivative of the invention.

The polyether derivative of the invention can be produced by allowing a polyether derivative represented by the following general formula (II) to react with an aromatic nitro compound represented by the general formula (III), thereby preparing a nitro compound represented by the general formula (IV), and subsequently reducing the nitro compound with hydrogen in the presence of a catalyst for catalytic hydrogen reduction:

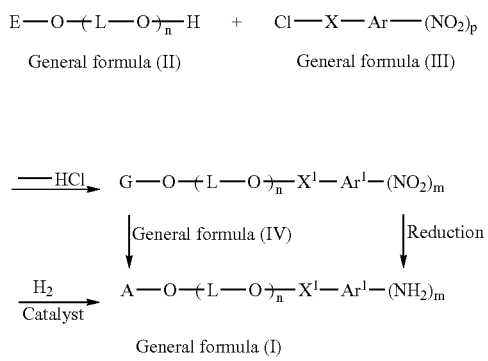

G: $-X^2-Ar^2-(NO_2)_1$, Hydrogen atom, alkyl group, aryl group, or acyl group

In the above-mentioned general formulae (II) and (III), E represents a hydrogen atom, or an alkyl, aryl or acyl group; X represents the above-mentioned $X^1$ or $X^2$; Ar represents the above-mentioned $Ar^1$ or $Ar^2$; p represents the above-mentioned m or 1; L represents alkylene; and n is an average addition mole number of a polyether group, and represents a number of 10 to 500.

The amount of the aromatic nitro compound represented by the general formula (III) used is preferably from 1.0 to 3.0 moles, more preferably from 1.0 to 1.5 moles, per one mole of hydroxyl groups of the polyether derivative represented by the general formula (II).

It is preferable to use a base such as triethylamine, pyridine, DBU (diazabicycloundecen) or sodium hydroxide in the reaction between the polyether derivative represented by the general formula (II) and the aromatic nitro compound represented by the general formula (III).

The amount of the base used is preferably from 1.0 to 3.0 moles, more preferably from 1.0 to 2.2 moles, per one mole of hydroxyl groups of the polyether derivative represented by the general formula (II).

In the above-mentioned reaction, a solvent may be used. Preferable examples of the solvent include toluene, acetonitrile, tetrahydrofuran and methylene chloride. Toluene and acetonitrile are particularly preferable. In the case of a solvent being used, the amount of the solvent used is preferably from 0.5 to 50 ml, more preferably from 1 to 10 ml, per one gram of the polyether derivative represented by the general formula (II).

The reaction temperature during the above-mentioned reaction is preferably a temperature of 0 to 100° C., or the reflux temperature of the solvent used, and is more preferably a temperature of 5 to 35° C.

It is also preferable that the polyether derivative represented by the general formula (II) is dehydrated before the reaction. Examples of methods used for dehydration include a method in which the polyether derivative is dehydrated by using a vacuum pump for several times under stirring while heated and kept at 60 to 100° C., and a method of dehydrating the polyether derivative by azeotropic dehydration with a solvent such toluene.

The compound represented by the general formula (IV) can be used in the reduction process in the next step without being purified. However, in the case that the compound is purified, the purification can be performed by removing the hydrochloride by filtration, and then conducting reprecipitation. A solvent used in the reprecipitation can be appropriately selected in accordance with the properties of the synthesized compound.

The catalyst for catalytic hydrogen reduction, which is used for the reduction of the compound represented by the general formula (IV) with hydrogen, may be any known catalyst for catalytic hydrogen reduction. Details of catalysts for catalytic hydrogen reduction are described in the "4$^{th}$ edition, Experimental Chemistry Lecture 26", pp.251 to 266 (edited by the Chemical Society of Japan and published by Maruzen Co., Ltd. in 1992). A Pd/C catalyst is particularly preferable from the viewpoints of both the costs and reactivity of the catalyst. The amount of the catalyst used is preferably from 0.005 to 0.1 g, more preferably from 0.008 to 0.05 g, per one gram of the compound represented by the general formula (IV).

A solvent may be used. The solvent is preferably methanol, ethanol, 2-propanol, tetrahydrofuran, or chloroform, and is more preferably methanol or ethanol. In the case of a solvent being used, the amount of the solvent used is preferably from 0.5 to 50 ml, more preferably from 1 to 10 ml, per one gram of the compound represented by the general formula (IV).

The reaction temperature during the above-mentioned reaction is a temperature of 0 to 60° C., or a reflux temperature of the solvent used, and is more preferably a temperature of 15 to 35° C. The addition of hydrogen may be performed at ordinary pressure, but pressure may be applied as and when necessary.

The produced polyether derivative represented by the general formula (I) can be isolated by removing the catalyst by filtration and then concentrating the filtrate. If necessary, the derivative can be purified by reprecipitation. A solvent used for the reprecipitation can be appropriately selected in accordance with the properties of the synthesized compound.

EXAMPLES

The present invention will be more specifically described by the following examples. However, the invention is not limited to these examples. In the examples, the term "part(s)" and the symbol "%" represent "part(s) by mass" and "% by mass", respectively.

Example 1

Synthesis of the Representative Compound (1-1)

The representative compound (1-1) was synthesized by the following synthesis method.

A vacuum pump was used to dry 60 g (13.8 mmol) of polyethylene glycol monomethyl ether ("Uniox M-4000", manufactured by NOF Corp., average molecular weight: 4350) at an outside temperature of 80° C. over 2 hours. 140 ml of acetonitrile and 3.8 ml (27 mmol) of triethylamine were added to the dried polyethylene glycol monomethyl ether under nitrogen gas flow. Next, a solution obtained by dissolving 2.82 g (15.2 mmol) of p-nitrobenzoylchloride in 50 ml of acetonitrile, was added to the solution in an ice bath in drips over a period of 30 minutes. Thereafter, the solution was stirred at room temperature for 2.5 hours, and then the solvent was distilled off. Thereto was added ethyl acetate, and the resultant solution was heated to 60° C. The solid undissolved was removed by filtration, and the filtrate was concentrated to yield a light yellow solid. This solid was reprecipitated by using ethyl acetate so as to yield 50.6 g of a nitrobenzoyl derivative of polyethylene glycol monomethyl ether. The yield thereof was 79%.

50 grams of the resultant nitrobenzoyl derivative of polyethylene glycol monomethyl ether were mixed with 0.5 g of 10% Pd/C (50% by weight in a wet state) and 150 ml of methanol, and then hydrogen gas was blown into the mixed solution at ordinary pressure. The solution was stirred at room temperature over 3 hours, and then filtered by means of celite filtration, to remove the catalyst. The filtrate was concentrated so as to yield 46 g of the representative compound (1-1) as a light yellow solid. The yield thereof was 92%.

The result of the identification of the resultant light yellow solid by $^1$H-NMR (CDCl$_3$) was as follows: δ (in ppm (parts per million) from TMS (tetramethyl silane)): 7.85 (d, 2H), 6.63 (d, 2H), 4.41 (t, 2H), 3.88 (t, 2H), 3.80 (t, 2H), 3.74–3.53 (m, ca. 384H), and 3.42–3.38 (m, 5H).

Example 2

Synthesis of the Representative Compound (1–2)

Under nitrogen gas flow, a solution obtained by dissolving 0.56 g (2.99 mmol) of p-nitrobenzoylchloride in 20 ml of acetonitrile, was added in drips over a period of 10 minutes to a mixture of 14.95 g (2.99 mmol) of polyethylene glycol monomethyl ether ("20,251-7" available from Aldrich Co., average molecular weight: 5000), 40 ml of acetonitrile, and 0.42 ml (3 mmol) of triethylamine, which mixture was cooled in an ice bath. Thereafter, the solution was stirred at room temperature for 3 hours, and then the solvent was distilled off. Thereto was added ethyl acetate, and the resultant solution was heated to 60° C. The solid undissolved was removed by filtration, and the filtrate was concentrated to yield a light yellow solid. This solid was reprecipitated by using ethyl acetate so as to yield 12.3 g of a nitrobenzoyl derivative of polyethylene glycol monomethyl ether. The yield thereof was 79%.

Then, 11.9 g (2.29 mmol) of the resultant nitrobenzoyl derivative of polyethylene glycol monomethyl ether was mixed with 0.12 g of 10% Pd/C (50% by weight in a wet state) and 60 ml of methanol, and then hydrogen gas was blown into the mixed solution at ordinary pressure. The solution was stirred at room temperature for 2 hours, and then filtered by means of celite filtration, to remove the catalyst. The filtrate was concentrated and then the resultant was reprecipitated by using ethyl acetate to yield 9.15 g of the representative compound (1–2) as a light yellow solid. The yield thereof was 77%.

The result of the identification of the resultant light yellow solid by $^1$H-NMR (CDCl$_3$) was as follows: δ (in ppm from TMS): 7.86 (d, 2H), 6.64 (d, 2H), 4.42 (t, 2H), 3.88 (t, 2H), 3.81 (t, 2H), 3.74–3.54 (m, ca. 444H), and 3.43–3.38 (m, 5H).

Example 3

Synthesis of the Representative Compound (1–3)

A vacuum pump was used to dry 20 g (10.0 mmol) of polyethylene glycol monomethyl ether ("20,250-9" available from Aldrich Co., average molecular weight: 2000) at an outside temperature of 80° C. over 2 hours, and then thereto were added 50 ml of acetonitrile and 2.8 ml (20 mmol) of triethylamine under nitrogen gas flow. Next, thereto was added in drips in an ice bath over a period of 45 minutes a solution of 2.04 g (11 mmol) of p-nitrobenzoylchloride dissolved in 30 ml of acetonitrile. The solution was stirred at room temperature for 2 hours, and then the solvent was distilled off. Thereto was added ethyl acetate, and the resultant solution was heated to 60° C. The solid undissolved was removed by filtration, and the filtrate was concentrated to yield a light yellow solid. This solid was reprecipitated by using ethyl acetate so as to yield 20.5 g of a nitrobenzoyl derivative of polyethylene glycol monomethyl ether. The yield thereof was 93%.

Then, 20 g of the resultant nitrobenzoyl derivative of polyethylene glycol monomethyl ether was mixed with 0.4 g of 10% Pd/C (50% by weight in a wet state) and 10 ml of methanol, and then hydrogen gas was blown into the mixed solution at ordinary pressure. The solution was stirred at room temperature for 3 hours, and then filtered by means of celite filtration to remove the catalyst. The filtrate was concentrated to yield 20 g of the representative compound (1–3) as a light yellow solid. The yield thereof was of an anticipated fixed quantity.

The result of the identification of the resultant light yellow solid by $^1$H-NMR (CDCl$_3$) was as follows: δ (in ppm from TMS): 7.85 (d, 2H), 6.64 (d, 2H), 4.41, (t, 2H), 3.88 (t, 2H), 3.72–3.53 (m, ca. 174H), and 3.42–3.38 (m, 5H).

Example 4

Synthesis of the Representative Compound (1-16)

A vacuum pump was used to dry 10.1 g (2.32 mmol) of polyethylene glycol monomethyl ether ("Uniox M-4000", manufactured by NOF Corp., average molecular weight: 4350) at an outside temperature of 80° C. over 2 hours, and then thereto were added 20 ml of acetonitrile and 0.70 ml (5 mmol) of triethylamine under nitrogen gas flow. Next, thereto was added in drips in an ice bath over a period of 20 minutes a solution of 0.59 g (2.55 mmol) of 3,5-dinitrobenzoylchloride dissolved in 10 ml of acetonitrile. The solution was stirred at room temperature for 3 hours, and then the solvent was distilled off. Thereto was added ethyl acetate, and the resultant solution was heated to 60° C. The solid undissolved was removed by filtration, and the filtrate was concentrated to yield a light red solid. This solid was reprecipitated from ethyl acetate so as to yield 8.24 g of a dinitrobenzoyl derivative of polyethylene glycol monomethyl ether. The yield thereof was 78%.

Then, 8.2 g of the resultant dinitrobenzoyl derivative of polyethylene glycol monomethyl ether was mixed with 0.16 g of 10% Pd/C (50% by weight in a wet state) and 50 ml of methanol, and then hydrogen gas was blown into the mixed solution at ordinary pressure. The solution was stirred at room temperature for 3 hours, and then filtered by means of celite filtration to remove the catalyst. The filtrate was concentrated to yield 8.1 g of the representative compound (1-16) as a light red solid. The yield thereof was 99%.

The result of the identification of the resultant light yellow solid by $^1$H-NMR (CDCl$_3$) was as follows: δ (in ppm from TMS): 6.78 (s, 2H), 6.20 (s, 1H), 4.41 (t, 2H), 3.83 (t, 2H), 3.80 (t, 2H), 3.74–3.53 (m, ca. 384H), and 3.42–3.38 (m, 5H).

The polyether derivative of the invention is a polyether derivative having a novel terminal amino group, and is a novel compound useful for many purposes such as chemical modification of microcapsules and physiologically active protein, and chemical modification in a drug delivery system. The process for producing the above-mentioned polyether derivative according to the invention is both practical and profitable which reduces the number of byproducts, simplifies the purification of the derivative process, and produces a good yield.

What is claimed is:

1. A polyether derivative represented by the following general formula (I):

A—O—(L—O)$_n$—X$^1$—Ar$^1$—(NH$_2$)$_m$  General formula (I)

wherein, in the general formula (I), X$^1$ represents —CO— or —SO$_2$—; Ar$^1$ represents unsubstituted arylene, or arylene substituted with a halogen atom, or an alkyl, alkenyl, alkynyl, alkoxy, alkoxycarbonyl, aryloxycarbonyl or cyano group; L represents alkylene; m is 1 or 2; A represents an alkyl, aryl or acyl group; and n is an average addition mole number of a polyether group, and is a numerical value of 10 to 500.

2. A polyether derivative according to claim 1, wherein the Ar$^1$ in the general formula (I) has 6 to 30 carbon atoms in all.

3. A polyether derivative according to claim 1, wherein -X$^1$—Ar$^1$-(NH$_2$)m in the general formula (I) is a 4-aminobenzoyl, 3,5-diaminobenzoyl or 4-aminobenzensulfonyl group.

4. A polyether derivative according to claim 1, wherein L in the general formula (I) is alkylene having 2 to 20 carbon atoms in all.

5. A polyether derivative according to claim 1, wherein L in the general formula (I) is selected from the group consisting of ethylene, propylene, tetramethylene, phenylethylene, cyclohexylene, vinylethylene and phenoxymethylethylene.

6. A polyether derivative according to claim 1, wherein repeating unit-(L-O)n- in the general formula (I) is selected from the group consisting of polyethylene oxide, polypropylene oxide, polytetramethylene oxide, polystyrene oxide, polycyclohexylene oxide, polyethylene oxide-polypropylene oxide block copolymer, and polyethylene oxide-polypropylene oxide random copolymer.

7. A polyether derivative according to claim 1, wherein A in the general formula (I) is an alkyl group having 1 to 30 carbon atoms in all.

8. A polyether derivative according to claim 1, wherein A in the general formula (I) is an aryl group having 6 to 30 carbon atoms in all.

9. A polyether derivative according to claim 1, wherein A in the general formula (I) is an acyl group having 2 to 30 carbon atoms in all.

10. A process for producing a polyether derivative, comprising:

causing a polyether derivative represented by the following general formula (II) to react with an aromatic nitro compound represented by the following general formula (III); and carrying out hydrogen reduction in the presence of a catalyst for catalytic hydrogen reduction to thereby yield a polyether derivative represented by the following general formula (I), A-O-(L-O—)$_n$—X$^1$—Ar$^1$—(NH$_2$)$_m$  General formula (I)

wherein, in the general formula (I), X$^1$ represents —CO— or —SO$_2$—; Ar$^1$ represents unsubstituted arylene, or arylene substituted with a halogen atom, or an alkyl, alkenyl, alkynyl, alkoxy, alkoxycarbonyl, aryloxycarbonyl or cyano group; L represents alkylene; m is 1 or 2; A represents an alkyl, aryl or acyl group; and n is an average addition mole number of a polyether group, and is a numerical value of 10 to 500, wherein, in the general formulae (II) and (III), E represents an alkyl, aryl or acryl group; X represents X$^1$; Ar represents Ar$^1$; p represents m; L represents alkylene; and n is an average addition mole number of a polyether group, and is a numerical value of 10 to 500

E-O-(L-O—)$_n$—H  General formula (II)

Cl—X—Ar—(NO$_2$)$_p$  General formula (III).

11. A process for producing the polyether derivative according to claim 10, wherein an amount of the aromatic nitro compound represented by the general formula (III) used is from 1.0 to 3.0 moles per mole of hydroxyl groups of the polyether derivative represented by the general formula (II).

12. A process for producing the polyether derivative according to claim 10, wherein for the reaction between the polyether derivative represented by the general formula (II) and the aromatic nitro compound represented by the general formula (III), a base selected from the group consisting of triethylamine, pyridine, DBU and sodium hydroxide is used.

13. A process for producing the polyether derivative according to claim 12, wherein an amount of the base used is from 1.0 to 3.0 moles per mole of hydroxyl groups of the pofyether derivative represented by the general formula (II).

14. A process for producing the polyether derivative according to claim 10, wherein for the reaction between the polyether derivative represented by the general formula (II) and the aromatic nitro compound represented by the general formula (III), a solvent selected from the group consisting of toluene, acetonitrile, tetrahydrofuran and methylene chloride is used.

15. A process for producing the polyether derivative according to claim 14, wherein an amount of the solvent used is from 0.5 to 50 ml per gram of the polyether derivative represented by the general formula (II).

16. A process for producing the polyether derivative according to claim 10, wherein the reaction between the polyether derivative represented by the general formula (II) and the aromatic nitro compound represented by the general formula (III) is conducted at a temperature of 0 to 100° C., or at a reflux temperature of a solvent used.

17. A process for producing the polyether derivative according to claim 10, wherein the polyether derivative represented by the general formula (II) is dehydrated before the reaction, and then used.

18. A process for producing the polyether derivative according to claim 10, wherein a solvent selected from the group consisting of methanol, ethanol, 2-propanol, tetrahydrofuran, and chloroform is used for the hydrogen reduction.

19. A process for producing the polyether derivative according to claim 10, wherein the hydrogen reduction is conducted at a temperature of 0 to 60° C., or at a reflux temperature of a solvent used.

* * * * *